(12) United States Patent
Hoff et al.

(10) Patent No.: US 7,911,079 B2
(45) Date of Patent: Mar. 22, 2011

(54) ELECTRICAL SYSTEM ARCHITECTURE HAVING HIGH VOLTAGE BUS

(75) Inventors: Brian Douglas Hoff, East Peoria, IL (US); Sivaprasad Akasam, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 593 days.

(21) Appl. No.: 11/882,248

(22) Filed: Jul. 31, 2007

(65) Prior Publication Data
US 2009/0033148 A1 Feb. 5, 2009

(51) Int. Cl.
*B60L 1/00* (2006.01)
(52) U.S. Cl. ....................................................... 307/10.1
(58) Field of Classification Search ................... 307/10.1
See application file for complete search history.

(56) References Cited

U.S. PATENT DOCUMENTS

| | | | |
|---|---|---|---|
| 5,398,506 A | 3/1995 | Martin | |
| 6,154,381 A | 11/2000 | Kajouke et al. | |
| 6,262,896 B1 | 7/2001 | Stancu et al. | |
| 6,321,145 B1 * | 11/2001 | Rajashekara | 701/22 |
| 6,771,045 B1 | 8/2004 | Keller | |
| 6,792,341 B2 | 9/2004 | Hunt et al. | |
| 6,795,756 B1 | 9/2004 | Zhang et al. | |
| 7,119,454 B1 | 10/2006 | Chiao | |
| 2005/0271916 A1 * | 12/2005 | Yang et al. | 429/20 |
| 2006/0222910 A1 * | 10/2006 | Aoyagi et al. | 429/12 |
| 2007/0080008 A1 | 4/2007 | Chiao | |
| 2007/0103002 A1 | 5/2007 | Chiao et al. | |
| 2007/0273209 A1 * | 11/2007 | Endou | 307/45 |

FOREIGN PATENT DOCUMENTS

GB 2 418 032 A 3/2006

* cited by examiner

*Primary Examiner* — Jared J Fureman
*Assistant Examiner* — Dru M Parries
(74) *Attorney, Agent, or Firm* — Finnegan, Henderson, Farabow, Garrett & Dunner LLC

(57) ABSTRACT

An electrical system architecture is disclosed. The architecture has a power source configured to generate a first power, and a first bus configured to receive the first power from the power source. The architecture also has a converter configured to receive the first power from the first bus and convert the first power to a second power, wherein a voltage of the second power is greater than a voltage of the first power, and a second bus configured to receive the second power from the converter. The architecture further has a power storage device configured to receive the second power from the second bus and deliver the second power to the second bus, a propulsion motor configured to receive the second power from the second bus, and an accessory motor configured to receive the second power from the second bus.

18 Claims, 3 Drawing Sheets

ELECTRICAL SYSTEM ARCHITECTURE HAVING HIGH VOLTAGE BUS

This invention was made with Government support under DOE Contract No. DE-FC36-01G011095 awarded by the U.S. Department of Energy. Accordingly, the Government may have certain rights to this invention.

TECHNICAL FIELD

The present disclosure is directed to an electrical system architecture and, more particularly, to an electrical system architecture having a high voltage bus.

BACKGROUND

Internal combustion engines such as gasoline engines, diesel engines, and gaseous fuel-powered engines exhaust a complex mixture of air pollutants. In an effort to reduce the potential negative effects of these pollutants on the environment, exhaust emission standards for these engine systems have become more stringent. In fact, many industrialized countries impose environmental regulations that limit the amount of pollutants emitted to the atmosphere from an engine, depending on the type, size, and/or class of engine.

In an effort to reduce gaseous emissions, an emphasis has been placed on using electrical power to operate various components associated with a vehicle. Hybrid vehicles have been developed, for example, that rely on a combination of electrical energy and energy produced by a power source (e.g. an internal combustion engine or a fuel cell) to power certain electrical accessories such as, for example, traction motors for maneuvering the hybrid vehicle. Another example of such an electrical accessory includes a hydraulic motor for use with heavy duty equipment such as, for example, an implement. Further, hybrid vehicles typically include one or more power storage devices (e.g. batteries) to receive and store excess electrical power from the power source and/or electrical power from regenerative dynamic braking of traction motors.

With the inclusion of power storage devices as alternate sources of electrical power, new electrical system architectures are being developed to make use of the power storage devices to increase the convenience, fuel economy, and safety of hybrid vehicles. For example, power storage devices may be configured to power the traction motors and/or electrical accessories for a limited period of time without requiring use of the power source. Thus, these architectures may reduce or eliminate fuel costs and emissions associated with the use of the power source during the limited period of time. Further, because start-up of a power source can take a relatively long period of time (e.g. five minutes for some heavy-duty hybrid vehicles), these architectures increase vehicle productivity by powering systems of the vehicle during the start-up period, thereby reducing equipment downtime during start-up.

One example of a system that provides power to accessories in a hybrid vehicle without requiring start-up of a main power unit is disclosed in U.S. Patent Application Publication 2007/0103002 ("the '002 publication") by Chiao et al. Specifically, the '002 publication discloses a heavy-duty hybrid vehicle power system including a main power unit, a power source (e.g. batteries, ultracapacitor packs, and/or flywheels), an electric propulsion motor, an electric accessory motor, and a DC-DC converter to step high voltage DC power down to a level required by low voltage accessories. The main power unit provides more than 42 volts of power to a DC power bus and is configured to provide power to the power source, the electric propulsion motor (via a first inverter), and the electric accessory motor (via a second inverter). The power source stores power from the main power unit as well as power generated from dynamic electromagnetic braking regeneration. The first inverter converts DC power from the DC power bus to AC power, which drives the electric propulsion motor to propel the heavy-duty hybrid vehicle. Similarly, the second inverter converts DC power from the DC power bus to AC power, which drives the electric accessory motor. The electric accessory motor powers a belt drive assembly, which drives one or more vehicle accessories. When the main power unit is shut down, the power source supplies DC power to the first inverter and the second inverter, thereby providing power to the electric propulsion motor and the electric accessory motor.

While the system of the '002 publication may provide power to an electric propulsion motor and an electric accessory motor without operating a main power unit, it may be inflexible. In particular, because the electric propulsion motor and the electric accessory motor are connected to the same DC power bus as the main power unit, the DC voltage delivered to the main bus is limited to the voltage output of the main power unit. As a result, changing the voltage output of the main power unit may necessitate changing the propulsion motor and accessory motor to comply with the voltage output of the main power unit.

Further, because the propulsion motor and the accessory motor are each limited to the voltage output of the main power unit, options for changing the propulsion motor and/or the accessory motor may be unnecessarily limited. For example, upgrading to smaller, lighter, more efficient high voltage motors may require a user of the hybrid vehicle to also upgrade the main power unit to provide the necessary output voltage. Thus, such an upgrade may be expensive.

The system of the '002 publication may further be inefficient because the power source may be connected to the same DC power bus as the DC-DC converter. That is, when the power source provides power to the accessories via the DC-DC converter, a portion of the power from the power source may be lost by the DC-DC converter, thus discharging the power source at an undesirably high rate. More specifically, the DC-DC converter may introduce power losses into the system when converting the DC power from the power source. As a result, the power source may discharge faster than if it were connected to power the accessories directly at a voltage appropriate for the accessories.

The disclosed electrical system architecture is directed to overcoming one or more of the problems set forth above.

SUMMARY OF THE INVENTION

One aspect of the present disclosure is directed to an electrical system architecture for a machine. The electrical system architecture includes a power source configured to generate DC power at a first voltage, and a first DC bus configured to receive DC power at the first voltage from the power source. The electrical system architecture also includes a DC/DC converter configured to receive DC power at the first voltage from the first DC bus and configured to convert DC power at the first voltage to DC power at a second voltage, wherein the second voltage is greater than the first voltage. The electrical system architecture further includes a second DC bus configured to receive DC power at the second voltage from the DC/DC converter, and a high voltage power storage device configured to receive DC power at the second voltage from the second DC bus and deliver DC power at the second voltage to the second DC bus. The electrical system architecture still further includes a propulsion motor configured to receive DC power at the second voltage from the second DC bus, and an accessory motor configured to receive DC power at the second voltage from the second DC bus.

Another aspect of the present disclosure is directed to a method. The method includes generating a first DC power, and converting at least a portion of the first DC power to a second DC power, wherein a voltage of the second DC power is greater than a voltage of the first DC power. The method also includes storing at least a portion of the second DC power. The method further includes driving a propulsion motor with at least one of the converted second DC power and the stored second DC power, and driving an accessory motor with at least one of the converted second DC power and the stored second DC power.

DETAILED DESCRIPTION

Figure 1:
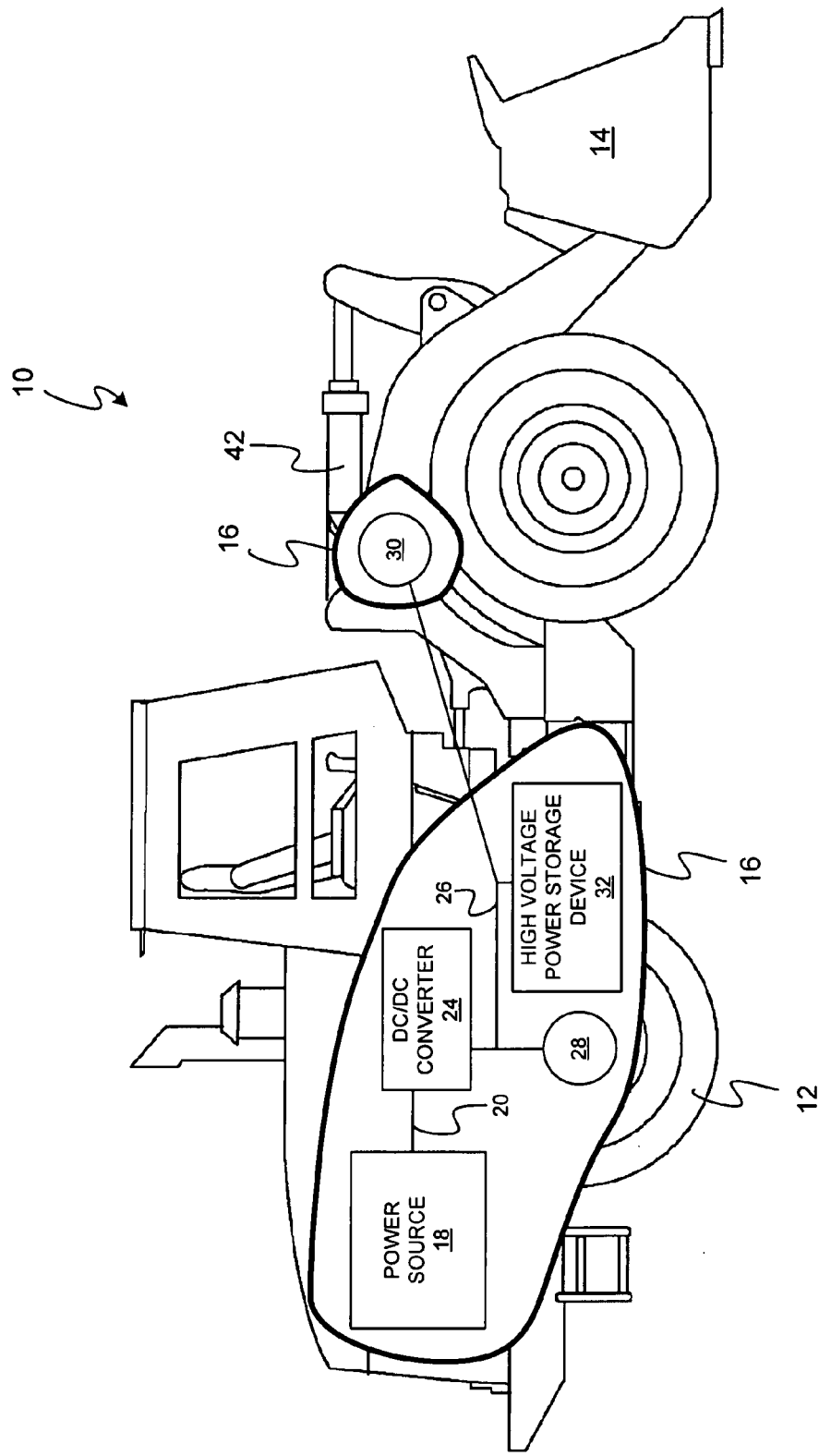
FIG. 1 is a diagrammatic and schematic illustration of an exemplary disclosed machine.

FIG. 1 illustrates an exemplary hybrid machine 10. Although hybrid machine 10 is illustrated as a wheel loader, it is contemplated that hybrid machine 10 may embody any mobile hybrid machine. For example, hybrid machine 10 may be an earth moving machine such as a dozer, a backhoe, an excavator, a motor grader, or any other earth moving machine. It is contemplated that hybrid machine 10 may alternatively embody any other type of mobile hybrid machine 10 such as, for example, a hybrid automobile. Hybrid machine 10 may include a traction device 12, an accessory 14, and an electrical system architecture 16 to provide power to traction device 12, accessory 14, and/or other components of hybrid machine 10.

Traction device 12 may embody one or more wheels located on each side of hybrid machine 10. It is contemplated that traction device 12 may additionally or alternatively embody one or more tracks, belts, and/or any other device for maneuvering hybrid machine 10. Traction device 12 may be driven mechanically, hydraulically, or in any other manner by one or more components of electrical system architecture 16. For example, traction device 12 may be driven by one or more electric motors associated with electrical system architecture 16 through a drivetrain that includes, for example, a clutch, a differential, and/or a drive geartrain.

Accessory 14 may include any vehicle accessory. That is, although accessory 14 is illustrated as a loading shovel, it should be appreciated that accessory 14 may alternatively embody any other type of machine implement such as, for example, a ripper or a plow. It is contemplated that accessory 14 may alternatively embody any other type of accessory such as, for example, hydraulic brakes. Accessory 14 may be driven mechanically, hydraulically, or in any other manner by one or more components of electrical system architecture 16. For example, accessory 14 may be driven by one or more electric motors associated with electrical system architecture 16 through a hydraulic actuator 42 including, for example, a pump to force pressurized fluid into and/or out of hydraulic actuator 42. It is further contemplated that hybrid machine 10 may include a plurality of accessories.

Figure 2:
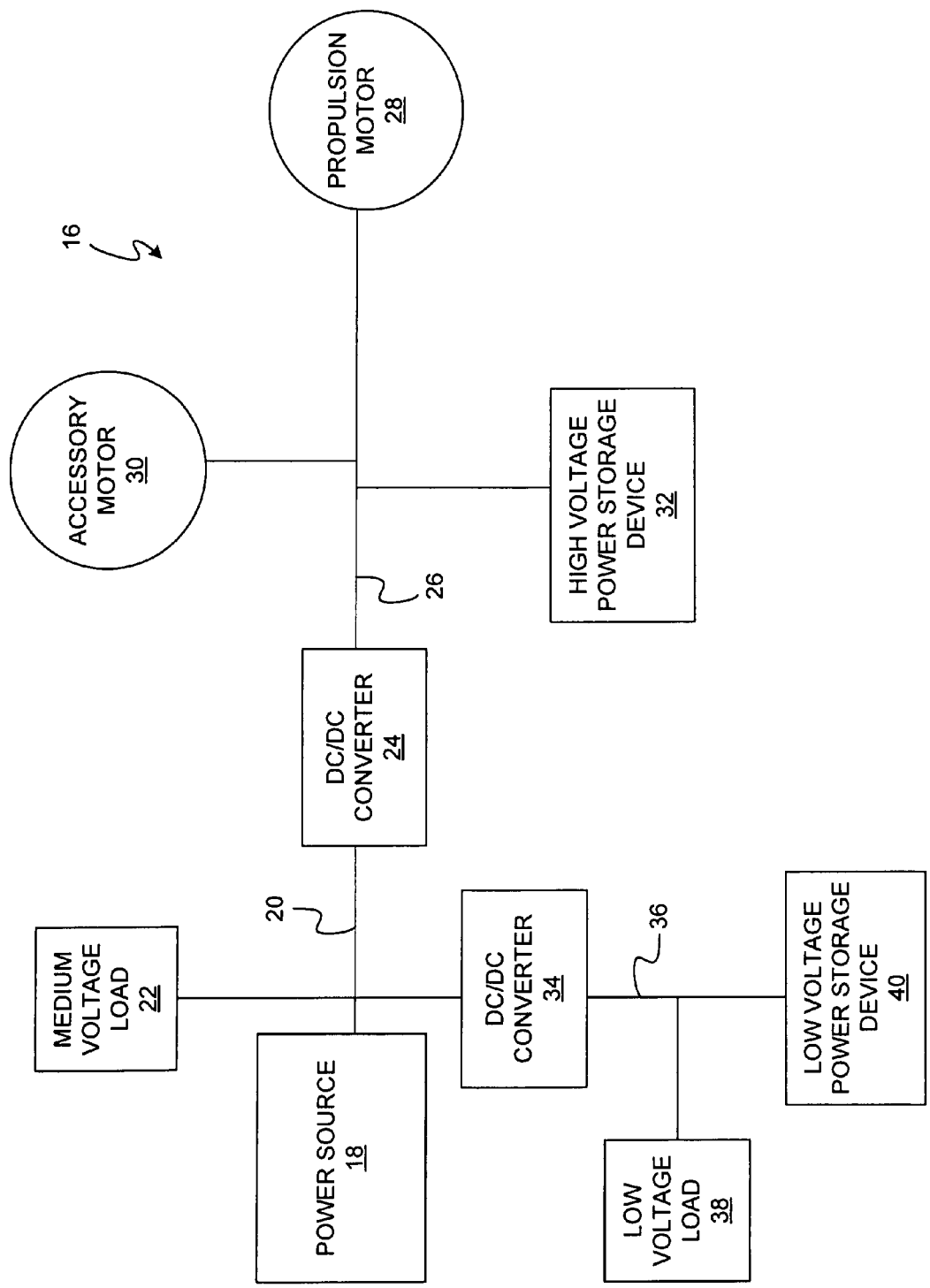
FIG. 2 is a schematic illustration of an electrical system architecture for use with the machine of FIG. 1.

Electrical system architecture 16 may provide electrical power to one or more components of hybrid machine 10. For example, as shown in FIG. 2, electrical system architecture 16 may include a power source 18, a medium voltage bus 20, a medium voltage load 22, a first DC/DC converter 24, a high voltage bus 26, a propulsion motor 28, an accessory motor 30, a high voltage power storage device 32, a second DC/DC converter 34, a low voltage bus 36, a low voltage load 38, and a low voltage power storage device 40.

Power source 18 may provide medium voltage direct current ("DC") power to electrical system architecture 16, and may include any suitable electrical power source. For example, power source 18 may embody a fuel cell or a generator set (e.g. an internal combustion engine mechanically coupled with a generator). Power source 18 may be configured to provide DC output of a desired voltage level or range. For example, power source 18 may provide a voltage output between about 250 V and 400 V (or any other suitable voltage level or range). Power source 18 may be electrically coupled with medium voltage bus 20 to deliver DC power to one or more components or subsystems of electrical system architecture 16. It is contemplated that, although not shown, power source 18 may be coupled with medium voltage bus 20 via any number of other components such as, for example, a contactor, switch, relay, circuit breaker, etc. It should further be appreciated that power source 18 may alternatively generate alternating current ("AC") power, and that the AC power may be converted to the medium voltage DC power by an AC/DC converter.

Medium voltage bus 20 may comprise an array of one or more wires operable to carry a medium voltage DC power signal. It is contemplated that the wires of medium voltage bus 20 may carry power signals of various voltages and/or currents and may include, among other signals, a ground signal. Medium voltage bus 20 may be configured to deliver DC power to and/or from medium voltage load 22, first DC/DC converter 24, and second DC/DC converter 34.

Medium voltage load 22 may include any number of auxiliary devices and/or systems of hybrid machine 10 that may be powered by the medium voltage DC power signal from medium voltage bus 20. For example, medium voltage load 22 may include a fan motor, a compressor motor, and/or one or more coolant pumps.

First DC/DC converter 24 may include a set of power electronics operable to convert DC power at a first voltage to DC power at a second voltage greater than the first voltage. More specifically, first DC/DC converter 24 may be configured to receive medium voltage DC power from medium voltage bus 20, convert the medium voltage DC power to high voltage DC power, and deliver the high voltage DC power to high voltage bus 26. As such, first DC/DC converter 24 may embody any power electronics capable of converting medium voltage DC power to high voltage DC power. For example, first DC/DC converter 24 may include any number of thyristors, insulated gate bipolar transistors (IGBTs), metal-oxide-semiconductor field-effect transistors (MOSFETs), bipolar junction transistors (BJTs), operational amplifiers (op-amps), resistors, capacitors, inductors, diodes, etc., configured to operate according to the present disclosure. It should be appreciated that many such circuits are known in the art, including, but not limited to, switched-mode converters, switched capacitor converters, etc. It should also be appreciated that because power is conserved in first DC/DC converter 24 and because the output voltage of first DC/DC converter 24 may be greater than its input voltage, that an output current of first DC/DC converter 24 may be less than an input current of first DC/DC converter 24. For example, in one exemplary embodiment of the present disclosure, the first voltage (i.e. medium voltage) may be about 400 V, and the second voltage (i.e. high voltage) may be about 850 V. Thus, if the input current of first DC/DC converter 24 is about 200 A, the power through first DC/DC converter 24 may be about 80 kW (i.e. 400 V×200 A) and the output current of first DC/DC converter 24 may be about 94 A (i.e. 80 kW/850 V). It is contemplated that first DC/DC converter 24 may additionally be operable in a reverse mode to convert high voltage DC power to medium voltage DC power. It is further contemplated that the output voltage and/or output current of first DC/DC converter 24 may be adjustable. It should be appreciated that the voltage output of first DC/DC converter 24 may additionally or alternatively include a negative voltage of high magnitude (e.g. −850 V). For example, if one or more high voltage accessories of hybrid machine 10 require a negative voltage of high magnitude, it should be appreciated that this negative voltage may be included in the output of first DC/DC converter 24.

High voltage bus 26 may comprise an array of one or more wires operable to carry a high voltage DC power signal. It is contemplated that the wires of high voltage bus 26 may carry power signals of various voltages and/or currents and may include, among other signals, a ground signal. High voltage bus 26 may be configured to deliver DC power to and/or from first DC/DC converter 24, propulsion motor 28, accessory motor 30, and high voltage power storage device 32. It should be appreciated that high voltage bus 26 may additionally be configured to deliver DC power to and/or from any number of other components such as, for example, a resistor grid configured to dissipate excess power from high voltage bus 26 as heat.

Propulsion motor 28 may be operable to receive high voltage DC power from high voltage bus 26 and produce a mechanical power output. For example, propulsion motor 28 may be electrically coupled to high voltage bus 26 to receive high voltage DC power, convert the high voltage DC power to a mechanical power output (e.g. an output torque), and deliver the mechanical power to traction device 12 to propel hybrid machine 10. It is contemplated that, although not shown, propulsion motor 28 may be coupled with high voltage bus 26 via any number of other components such as, for example, a contactor, switch, circuit breaker, relay, or any other suitable device. It should be appreciated that propulsion motor 28 may be configured to drive traction device 12 in any suitable manner, such as, for example, through a drivetrain, torque converter, etc. The speed and/or torque of the mechanical power output of propulsion motor 28 may be at least partially dependent on the voltage and/or current of the high voltage DC power from high voltage bus 26. As such, propulsion motor 28 may additionally include power electronics and/or a control system to control the voltage and/or current delivered to drive propulsion motor 28. For example, propulsion motor 28 may include any number of controllers, thyristors, IGBTs, MOSFETs, BJTs, op-amps, resistors, capacitors, inductors, diodes, etc., configured to operate according to the present disclosure. That is, propulsion motor 28 may embody any known DC motor capable of operating in accordance with the present disclosure, such as, for example, a switched reluctance motor.

Propulsion motor 28 may also be operable to receive mechanical power for generating high voltage DC power in a dynamic braking mode. For example, propulsion motor 28 may embody a DC motor/generator configured to receive an input torque from traction device 12 and deliver high voltage DC power to high voltage bus 26. It is also contemplated that the voltage and/or current delivered to drive propulsion motor 28 may additionally or alternatively be controlled by power electronics and/or control systems included in other components of electrical system architecture 16, such as, for example, first DC/DC converter 24 and/or high voltage power storage device 32. It should be appreciated that propulsion motor 28 may alternatively embody a plurality of propulsion motors 28 and that the power output of propulsion motor 28 may alternatively embody any other type of power output known in the art, such as, for example, hydraulic or pneumatic power.

Accessory motor 30 may be configured to drive an accessory (such as, for example, accessory 14 of FIG. 1), and may be powered by high voltage DC power. For example, accessory motor 30 may be electrically coupled with high voltage bus 26 to receive high voltage DC power therefrom. It is contemplated that, although not shown, accessory motor 30 may be coupled with high voltage bus 26 via any number of other components such as, for example, a contactor, switch, circuit breaker, relay, or any other suitable device. Accessory motor 30 may be operatively coupled to accessory 14 to provide a mechanical power output for driving accessory 14. For example, accessory motor 30 may be mechanically, hydraulically, and/or pneumatically coupled to accessory 14 and configured to operate accessory 14 for performing a task associated with hybrid machine 10. In an exemplary embodiment of the present disclosure, accessory motor 30 may be mechanically coupled with hydraulic actuator 42 that may be operated to control the movement of accessory 14. More specifically, accessory motor 30 may be powered by the high voltage DC power from high voltage bus 26 to produce a mechanical power output such as, for example, a rotation of a shaft (not shown). The shaft may be mechanically coupled with the pump of hydraulic actuator 42 such that a rotation of the shaft may drive the pump to force pressurized fluid into and/or out of hydraulic actuator 42, thus driving the movement of accessory 14.

Accessory motor 30 may be configured to receive high voltage DC power associated with high voltage bus 26 to produce a torque output. The speed and/or torque of the mechanical power output of accessory motor 30 may be dependent on the voltage and/or current of the high voltage DC power from high voltage bus 26. As such, accessory motor 30 may additionally include power electronics and/or a control system to control the voltage and/or current delivered to drive accessory motor 30. For example, accessory motor 30 may include any number of controllers, thyristors, IGBTs, MOSFETs, BJTs, op-amps, resistors, capacitors, inductors, diodes, etc., configured to operate according to the present disclosure. That is, accessory motor 30 may embody any known DC motor capable of operating in accordance with the present disclosure, such as, for example, a switched reluctance motor. It is contemplated that accessory motor 30 may additionally be operable to receive mechanical power and use it to generate high voltage DC power in a dynamic regeneration mode. For example, accessory motor 30 may embody a DC motor/generator. It is also contemplated that the voltage and/or current delivered to drive accessory motor 30 may additionally or alternatively be controlled by power electronics and/or control systems included in other components of electrical system architecture 16, such as, for example, first DC/DC converter 24 and/or high voltage power storage device 32. It should be appreciated that accessory motor 30 may alternatively embody a plurality of accessory motors 30 (e.g. each associated with a respective accessory 14 of hybrid machine 10) and/or any other type of electrically-powered accessory actuator, such as, for example, a hydraulic pump.

High voltage power storage device 32 may be any type of power storage device such as, for example, a battery, an ultra-capacitor, or a flywheel. In an exemplary embodiment of the present disclosure, high voltage power storage device 32 may store high voltage DC power from high voltage bus 26. For example, high voltage power storage device 32 may store excess power generated by power source 18 and/or generated by regenerative dynamic braking of propulsion motor 28.

Alternatively or additionally, high voltage power storage device 32 may provide high voltage DC power to high voltage bus 26. For example, high voltage power storage device 32 may provide high voltage DC power to propulsion motor 28 and/or accessory motor 30 when power source 18 is deactivated, unavailable, or operating at a reduced power output capacity. Additionally or alternatively, high voltage power storage device 32 may supply additional high voltage DC power that may be used by propulsion motor 28 and/or accessory motor 30 during operation of power source 18 to, for example, reduce some of the burden on power source 18 during peak periods. In an exemplary embodiment of the present disclosure, high voltage power storage device 32 may store high voltage DC power at 850 Volts. It is contemplated that, although not shown, high voltage power storage device 32 may be coupled with high voltage bus 26 via any number of other components such as, for example, a contactor, switch, circuit breaker, relay, or any other suitable device.

Second DC/DC converter 34 may include a set of power electronics operable to convert DC power at the first voltage to DC power at a third voltage less than the first voltage. More specifically, second DC/DC converter 34 may be configured to receive medium voltage DC power from medium voltage bus 20, convert the medium voltage DC power to low voltage DC power, and deliver the low voltage DC power to low voltage bus 36. As such, second DC/DC converter 34 may embody any power electronics capable of converting medium voltage DC power to low voltage DC power. For example, second DC/DC converter 34 may include any number of thyristors, IGBTs, MOSFETs, BJTs, op-amps, resistors, capacitors, inductors, diodes, etc., configured to convert medium voltage DC power to low voltage DC power. Second DC/DC converter 24 may include one or more power converters such as, for example, a switched-mode converter, a switched capacitor converter, etc. It should also be appreciated that because power is conserved in second DC/DC converter 34 and because the output voltage of second DC/DC converter 34 may be less than its input voltage, that an output current of second DC/DC converter 34 may be greater than an input current of second DC/DC converter 34. For example, in one exemplary embodiment of the present disclosure, the third voltage (i.e. low voltage) may be about 24 V, and the first voltage (i.e. medium voltage) may be about 400 V. Thus, if the input current of second DC/DC converter 34 is about 20 A, the power through second DC/DC converter 34 may be about 8 kW (i.e. 400 V×20 A) and the output current of second DC/DC converter 34 may be about 333 Å (i.e. 8 kW/24 V). It is contemplated that second DC/DC converter 34 may additionally be operable in a reverse mode to convert low voltage DC power to medium voltage DC power. It is further contemplated that the output voltage and/or output current of second DC/DC converter 34 may be controllable. It is also contemplated that the voltage output of second DC/DC converter 34 may additionally or alternatively include a negative voltage of low magnitude.

Low voltage bus 36 may comprise an array of one or more wires operable to carry a low voltage DC power signal. It is contemplated that the wires of low voltage bus 36 may carry power signals of various voltages and/or currents and may include a ground signal. Low voltage bus 36 may be configured to deliver DC power to and/or from second DC/DC converter 34, low voltage load 38, and low voltage power storage device 40.

Low voltage load 38 may include any number of auxiliary devices and/or systems of hybrid machine 10 that may be powered by the low voltage DC power signal from low voltage bus 36. For example, low voltage load 38 may include lighting systems, heating systems, coolant systems, and/or control systems.

Low voltage power storage device 40 may be any type of known power storage device such as, for example, a battery, an ultra-capacitor, or a flywheel. In an exemplary embodiment of the present disclosure, low voltage power storage device 40 may store low voltage DC power from low voltage bus 36. For example, low voltage power storage device 40 may store excess power generated by power source 18 via second DC/DC converter 34 and/or generated by low voltage load 38. Additionally or alternatively, low voltage power storage device 40 may provide low voltage DC power to low voltage bus 36. For example, low voltage power storage device 40 may provide low voltage DC power to low voltage load 38 when power source 18 is deactivated, unavailable, or operating at a reduced power output capacity. Additionally or alternatively, low voltage power storage device 40 may provide additional low voltage DC power that may be used by low voltage load 38 during operation of power source 18, for example, during peak operating periods. In an exemplary embodiment of the present disclosure, low voltage power storage device 40 may store low voltage DC power at 24 Volts. It should be appreciated that although not shown, low voltage power storage device 40 may be coupled with low voltage bus 36 via any number of other components such as, for example, a contactor, circuit breaker, switch, relay, etc.

Figure 3:
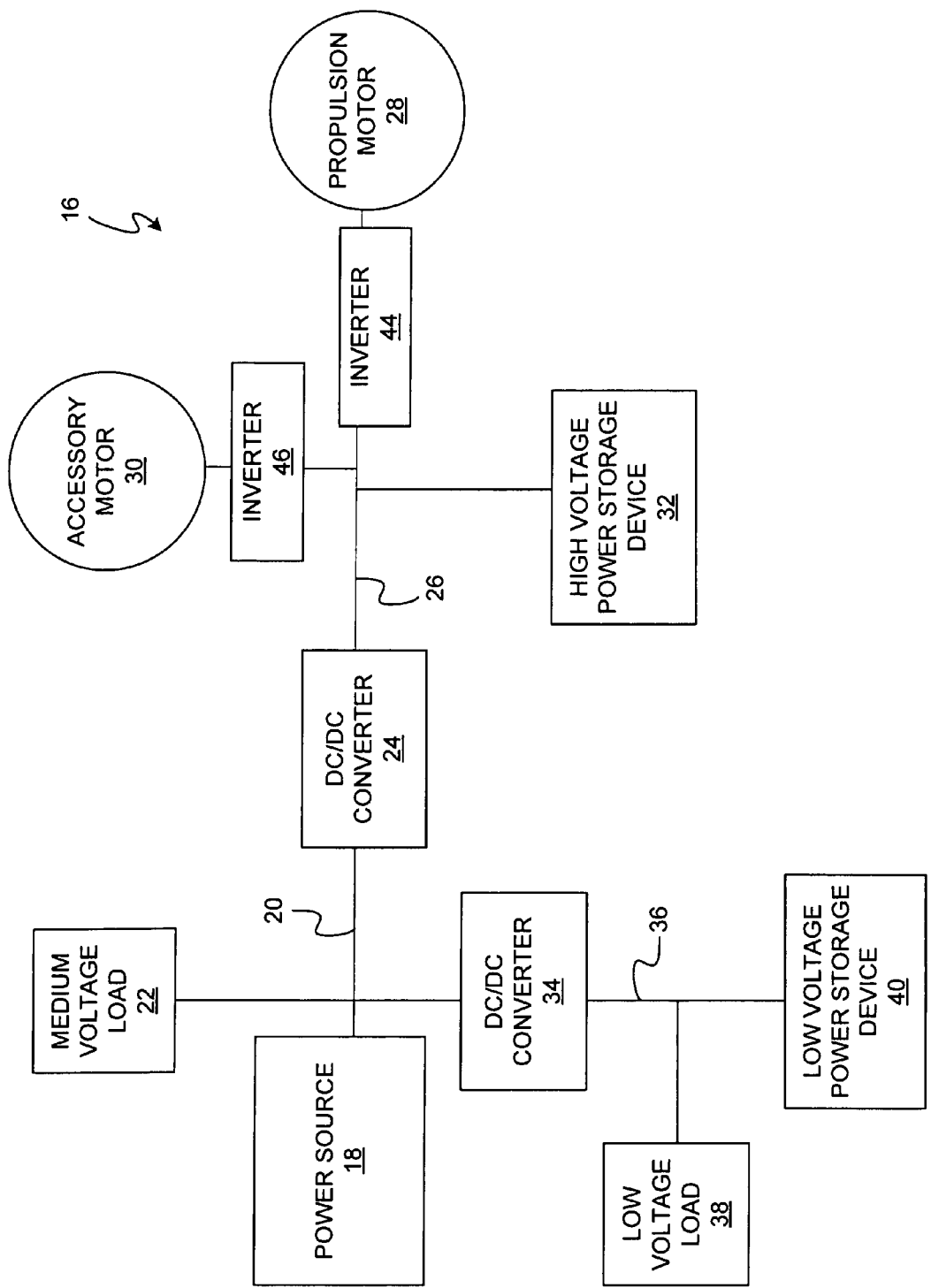
FIG. 3 is a schematic illustration of another electrical system architecture for use with the machine of FIG. 1.

FIG. 3 illustrates an alternative embodiment of electrical system architecture 16. Similar to electrical system architecture 16 of FIG. 2, electrical system architecture 16 of FIG. 3 may include power source 18, medium voltage bus 20, medium voltage load 22, first DC/DC converter 24, medium voltage bus 20, accessory motor 30, propulsion motor 28, high voltage power storage device 32, second DC/DC converter 34, low voltage bus 36, low voltage load 38, and low voltage power storage device 40. However, in contrast to electrical system architecture 16 of FIG. 2, propulsion motor 28 and accessory motor 30 of electrical system architecture 16 of FIG. 3 may each embody any type of AC-powered motor, and electrical system architecture 16 of FIG. 3 may further include a first inverter 44, and a second inverter 46 respectively connecting propulsion motor 28 and accessory motor 30 to high voltage bus 26.

First and second inverters 44, 46 may each comprise a set of power electronics operable to convert DC power to AC power. More specifically, first and second inverters 44, 46 may be configured to receive high voltage DC power from high voltage bus 26, convert the high voltage DC power to AC power, and deliver the AC power to propulsion motor 28 and accessory motor 30, respectively. First and second inverters 44, 46 may each include, for example, any number of thyristors, IGBTs, MOSFETs, BJTs, op-amps, resistors, capacitors, inductors, diodes, etc., configured to convert DC power to AC power. First and second inverters 44, 46 may each include one or more circuits such as, for example, a switched-mode power supply, an H-bridge inverter, etc. In one exemplary embodiment of the present disclosure, first and second inverters 44, 46 may each embody a three-phase converter with controllable frequency, current, and/or voltage parameters such that a frequency, current, and/or voltage of the AC power generated by first and second inverters 44, 46 may be controllably set. It is contemplated that first and second inverters 44, 46 may each be operable in a reverse mode to convert AC power to high voltage DC power.

INDUSTRIAL APPLICABILITY

The system of the present disclosure may provide an electrical system architecture with at least one propulsion motor and at least one accessory motor connected to the same high voltage bus as a high voltage power storage device. As such, the electrical system architecture of the present disclosure may be capable of providing power to the at least one propulsion motor and/or the at least one accessory motor without requiring use of a power source. For example, while the power source is turned off, high voltage power from the high voltage power storage device may be used to power the at least one propulsion motor to move a hybrid machine associated with the disclosed electrical system architecture. Additionally or alternatively, while the power source is turned off, high voltage power from the high voltage power storage device may be used to power the at least one accessory motor to move an accessory (e.g. an implement) of a hybrid machine associated with the disclosed electrical system architecture. The disclosed electrical system architecture may be applicable to any hybrid machine and, in particular, to any hybrid machine having at least one traction device and at least one accessory that can be at least partially driven by electrical power. The operation of electrical system architecture 16 with regard to hybrid machine 10 will now be explained.

Referring to FIG. 1, hybrid machine 10 may be propelled by a movement of traction device 12, and may perform one or more functions by way of a movement of accessory 14. Traction device 12 and accessory 14 may both be powered to move by one or more components of electrical system architecture 16. For example, a mechanical power output of propulsion motor 28 may drive the movement of traction device 12 while a mechanical power output of accessory motor 30 may drive the movement of accessory 14 via hydraulic actuator 42. Each of propulsion motor 28 and accessory motor 30 may be powered by electrical power (i.e. DC power) provided by one or more components of electrical system architecture 16. Operation of electrical system architecture 16 will now be described in further detail with regard to FIG. 2.

Power source 18 may produce a medium voltage DC power output, and deliver the medium voltage DC power to medium voltage bus 20. At least a first portion of the medium voltage DC power delivered to medium voltage bus 20 may be delivered to medium voltage load 22. Similarly, at least a second portion of the medium voltage DC power delivered to medium voltage bus 20 may be delivered to second DC/DC converter 34. Second DC/DC converter 34 may convert the medium voltage DC power to low voltage DC power and deliver the low voltage DC power to low voltage bus 36. Low voltage bus 36 may thus deliver at least a first portion of the low voltage DC power to low voltage load 38 and at least a second portion of the low voltage DC power to low voltage power storage device 40. Low voltage power storage device 40 may store at least a portion of the low voltage power that it receives.

Low voltage power storage device 40 may further deliver low voltage power to low voltage bus 36. More specifically, low voltage power storage device 40 may provide low voltage DC power to low voltage load 38 via low voltage bus 36. In this manner, the low voltage DC power from low voltage power storage device 40 may supplement and/or replace the low voltage DC power from second DC/DC converter 34 if, for example, power source 18 is deactivated, unavailable, or operating at a reduced power output capacity. It is contemplated that the low voltage DC power from low voltage power storage device 40 may additionally or alternatively be delivered to second DC/DC converter 34 via low voltage bus 36, and converted to medium voltage DC power by second DC/DC converter 34. In this manner, second DC/DC converter 34 may deliver the converted medium voltage DC power to medium voltage load 22 and/or first DC/DC converter 24 via medium voltage bus 20.

At least a third portion of the medium voltage DC power carried by medium voltage bus 20 may be delivered to first DC/DC converter 24. First DC/DC converter 24 may convert the medium voltage DC power to high voltage DC power and deliver the high voltage DC power to high voltage bus 26. High voltage bus 26 may then deliver at least a first portion of the high voltage DC power to propulsion motor 28 and at least a second portion of the high voltage DC power to accessory motor 30 to drive propulsion motor 28 and accessory motor 30, respectively. That is, propulsion motor 28 may be powered by the high voltage DC power from high voltage bus 26 to produce a mechanical power output that may drive traction device 12 to propel hybrid machine 10, as discussed above. Similarly, accessory motor 30 may be powered by the high voltage DC power from high voltage bus 26 to produce a mechanical power output that may drive the pump of hydraulic actuator 42, which may thus actuate a movement of accessory 14.

High voltage bus 26 may additionally deliver at least a third portion of the high voltage DC power to high voltage power storage device 32. High voltage power storage device 32 may operate similar to low voltage power storage device 40. For example, high voltage power storage device 32 may store at least a portion of the high voltage DC power that it receives, and may further deliver high voltage DC power to high voltage bus 26. More specifically, high voltage power storage device 32 may provide high voltage DC power to propulsion motor 28 and/or accessory motor 30 via high voltage bus 26. In this manner, the high voltage DC power from high voltage power storage device 32 may supplement and/or replace the high voltage DC power from first DC/DC converter 24 if, for example, power source 18 is deactivated, unavailable, or operating at a reduced power output capacity. It should be appreciated that high voltage power storage device 32 may additionally receive high voltage DC power generated by propulsion motor 28 during a regenerative dynamic braking mode.

In a particular example, it may be desirable to move hybrid machine 10 a relatively short distance when power source 18 is turned off. Rather than unnecessarily spending time and/or fuel starting power source 18, high voltage power storage device 32 may provide high voltage DC power to drive propulsion motor 28 to move hybrid machine 10. It should be appreciated that by using high voltage power storage device 32 in this manner, exhaust emissions that may have been produced by power source 18 while moving hybrid machine 10 over such a short distance may be eliminated. In another example, it may be desirable to move accessory 14 for a short period of time when power source 18 is turned off (e.g. in order to conduct a small loading operation or to reposition accessory 14 when providing maintenance to hybrid machine 10). Again, time and/or fuel may be saved and emissions may be eliminated by utilizing high voltage DC power from high voltage power storage device 32 to drive accessory motor 30 to move accessory 14.

It is contemplated that the high voltage DC power from high voltage power storage device 32 may additionally or alternatively be delivered to first DC/DC converter 24 via high voltage bus 26, and converted to medium voltage DC power by first DC/DC converter 24. In this manner, first DC/DC converter 24 may deliver the converted medium voltage DC power to medium voltage load and/or second DC/DC converter 34 via medium voltage bus 20.

Referring now to the embodiment illustrated in FIG. 3, much of the operation of electrical system architecture 16 may remain substantially unchanged from the above-described operation. The inclusion of first inverter 44 and second inverter 46 may substantially affect only the operations of propulsion motor 28 and accessory motor 30. In particular, the first portion of the high voltage DC power from high voltage bus 26 may be converted to AC power by first inverter 44. The converted AC power may then power propulsion motor 28 to drive traction device 12, as discussed above. If propulsion motor 28 is operated in a dynamic braking mode, propulsion motor 28 may generate AC power. The AC power may then be converted to high voltage DC power by first inverter 44 (i.e. first inverter 44 may operate as a rectifier), and delivered to high voltage bus 26. Further, the second portion of the high voltage DC power from high voltage bus 26 may be converted to AC power by second inverter 46. The converted AC power may then power accessory motor 30 to drive accessory 14.

The present disclosure may provide a flexible electrical system architecture that is capable of powering a propulsion motor and/or an accessory motor without use of a power source. In particular, because the power source may be connected to the high voltage bus and the low voltage bus via respective DC/DC converters, the levels and/or ranges of the high voltage DC power and low voltage DC power of the electrical system architecture may be varied independently of the power source. That is, it may be possible to change the levels and/or ranges of the high voltage DC power and/or the low voltage DC power by adjusting one or more of the DC/DC converters, or by replacing one or more of the DC/DC converters without making substantial changes to the power source. Because DC/DC converters may be relatively less expensive than power sources, replacing one or more of the DC/DC converters may also be less expensive than replacing the power source to change the levels and/or ranges of the high voltage DC power and/or the low voltage DC power.

Further, the electrical system architecture of the present disclosure may provide flexibility with regard to options for changing the propulsion motor and/or the accessory motor. For example, because the first DC/DC converter may be adjusted or replaced to increase the level and/or range of the high voltage DC power, the electrical system architecture may provide an efficient and inexpensive way to upgrade one or more of the motors to smaller, lighter, more efficient high voltage motors. With smaller, lighter motors, the electrical system architecture may further be adapted to a wide variety of machines having differing size and weight constraints such as, for example, under-hood space requirements or maximum weight restrictions.

The electrical system architecture of the present disclosure may also increase efficiency because the low voltage loads may be connected to the same low voltage bus as the low voltage power storage device. More specifically, because the low voltage DC power from the low voltage power storage device may be delivered to power the low voltage loads without first traveling through a power converter, substantially all of the power from the low voltage power storage device may be delivered to power the low voltage loads. As a result, the amount of time that the low voltage power storage device may be used to power the low voltage loads may be maximized.

It will be apparent to those skilled in the art that various modifications and variations can be made to the electrical system architecture of the present disclosure without departing from the scope of the disclosure. Other embodiments will be apparent to those skilled in the art from consideration of the specification and the practice of the electrical system architecture disclosed herein. It is intended that the specification and examples be considered as exemplary only, with a true scope of the disclosure being indicated by the following claims and their equivalents.

What is claimed is:

1. An electrical system architecture for a machine, comprising:
   a power source configured to generate DC power at a first voltage;
   a first DC bus configured to receive DC power at the first voltage from the power source;
   at least one medium voltage load configured to receive DC power at the first voltage from the first DC bus;
   a first DC/DC converter configured to receive DC power at the first voltage from the first DC bus and convert DC power at the first voltage to DC power at a second voltage, wherein the second voltage is greater than the first voltage;
   a second DC bus configured to receive DC power at the second voltage from the first DC/DC converter;
   a high voltage power storage device configured to receive DC power at the second voltage from the second DC bus and deliver DC power at the second voltage to the second DC bus;
   a propulsion motor configured to receive DC power at the second voltage from the second DC bus;
   an accessory motor configured to receive DC power at the second voltage from the second DC bus; and
   a second DC/DC converter configured to receive DC power at the first voltage from the first DC bus and convert DC power at the first voltage to DC power at a third voltage, wherein the third voltage is less than the first voltage, and the first DC/DC converter and the second DC/DC converter are configured to divide DC power at the first voltage from the power source.

2. The electrical system architecture of claim 1, wherein the power source is at least one of a fuel cell and an engine coupled with a generator.

3. The electrical system architecture of claim 1, wherein the accessory motor is a hydraulic motor.

4. The electrical system architecture of claim 3, wherein the accessory motor is configured to drive a hydraulic implement.

5. The electrical system architecture of claim 1, wherein the accessory motor is a plurality of accessory motors.

6. The electrical system architecture of claim 1, wherein:
   the propulsion motor is an AC propulsion motor; and
   the electrical system architecture further includes an inverter, wherein the inverter is configured to:
      receive DC power at the second voltage from the second DC bus;
      convert DC power at the second voltage to AC power; and
      deliver AC power to the propulsion motor.

7. The electrical system architecture of claim 1, wherein:
   the accessory motor is an AC accessory motor; and
   the electrical system architecture further includes an inverter, wherein the inverter is configured to:
      receive DC power at the second voltage from the second DC bus;

convert DC power at the second voltage to AC power; and deliver AC power to the accessory motor.

8. The electrical system architecture of claim 1, wherein:
the electrical system architecture further includes:
   a third DC bus configured to receive DC power at the third voltage from the second DC/DC converter; and
   at least one low voltage load configured to receive DC power at the third voltage from the third DC bus.

9. The electrical system architecture of claim 8, wherein:
the electrical system architecture further includes a low voltage power storage device configured to receive DC power at the third voltage from the third DC bus and deliver DC power at the third voltage to the third DC bus; and the second DC/DC converter is further configured to receive DC power at the third voltage from the third DC bus and configured to:
   convert DC power at the third voltage to DC power at the first voltage; and
   deliver DC power at the first voltage to the first DC bus.

10. The electrical system architecture of claim 1, wherein the first voltage is between about 250-400 Volts.

11. The electrical system architecture of claim 1, wherein the second voltage is about 850 Volts.

12. A method, comprising:
generating a first DC power;
powering at least one medium voltage load with the first DC power;
converting at least a portion of the first DC power to a second DC power with a first DC/DC converter, wherein a voltage of the second DC power is greater than a voltage of the first DC power;
storing at least a portion of the second DC power;
driving a propulsion motor with at least one of the converted second DC power and the stored second DC power;
driving an accessory motor with at least one of the converted second DC power and the stored second DC power; and
converting at least a portion of the first DC power to a third DC power with a second DC/DC converter, wherein a voltage of the third DC power is less than a voltage of the first DC power, and the first DC/DC converter and the second DC/DC converter are configured to divide at least a portion of the first DC power.

13. The method of claim 12, wherein driving a propulsion motor includes:
   converting at least one of the converted second DC power and the stored second DC power to an AC power; and
   driving the propulsion motor with the AC power.

14. The method of claim 12, wherein driving an accessory motor includes:
   converting at least one of the converted second DC power and the stored second DC power to an AC power; and
   driving the accessory motor with the AC power.

15. The method of claim 12, wherein driving an accessory motor includes driving a plurality of accessory motors with at least one of the converted second DC power and the stored second DC power.

16. The method of claim 12, further including:
powering at least one low voltage load with the third DC power.

17. The method of claim 16, further including:
storing at least a portion of the third DC power; and
converting at least a portion of the stored third DC power to the first DC power, wherein powering at least one low voltage load includes powering the at least one low voltage load with at least one of the converted third DC power and the stored third DC power.

18. A machine comprising:
a traction device configured to propel the machine;
a hydraulic implement;
a fuel cell configured to generate DC power at a first voltage;
a first DC bus configured to receive DC power at the first voltage from the fuel cell;
a first DC/DC converter configured to receive DC power at the first voltage from the first DC bus and configured to convert DC power at the first voltage to DC power at a second voltage, wherein the second voltage is greater than the first voltage;
a second DC bus configured to receive DC power at the second voltage from the DC/DC converter;
a high voltage power storage device configured to receive DC power at the second voltage from the second DC bus and deliver DC power at the second voltage from the second DC bus;
a propulsion motor configured to:
   receive DC power at the second voltage from the second DC bus; and
   drive the traction device;
a hydraulic motor configured to:
   receive DC power at the second voltage from the second DC bus; and
   drive the hydraulic implement;
at least one medium voltage load configured to receive DC power at the first voltage from the first DC bus;
a second DC/DC converter, wherein the second DC/DC converter is configured to:
   receive DC power at the first voltage from the fuel cell and the first DC/DC converter through the first DC bus and deliver DC power at the first voltage to the first DC bus; and
   convert DC power at the first voltage to DC power at 24 Volts and convert DC power at 24 Volts to DC power at the first voltage;
a third DC bus configured to receive DC power at 24 Volts from the second DC/DC converter and deliver DC power at 24 Volts to the second DC/DC converter;
at least one low voltage load configured to receive DC power at 24 volts from the third DC bus; and
a low voltage power storage device configured to receive DC power at 24 Volts from the third DC bus and deliver DC power at 24 Volts to the third DC bus.

* * * * *